US012609760B2

(12) United States Patent
Yu et al.

(10) Patent No.: US 12,609,760 B2
(45) Date of Patent: Apr. 21, 2026

(54) SATELLITE COMMUNICATION SYSTEM WITH GATEWAY DIVERSITY

(71) Applicant: AST & Science, LLC, Miami, FL (US)

(72) Inventors: Zhi Zhong Yu, Reading (GB);
Federico Pedro Fawzi, Midland, TX (US)

(73) Assignee: AST & Science, LLC, Miami, FL (US)

( * ) Notice: Subject to any disclaimer, the term of this patent is extended or adjusted under 35 U.S.C. 154(b) by 323 days.

(21) Appl. No.: 18/219,758

(22) Filed: Jul. 10, 2023

(65) Prior Publication Data

US 2024/0022318 A1 Jan. 18, 2024

Related U.S. Application Data

(60) Provisional application No. 63/339,001, filed on Jul. 13, 2022.

(51) Int. Cl.
| | |
|---|---|
| *H04B 7/185* | (2006.01) |
| *H04W 84/06* | (2009.01) |
| *H04W 88/16* | (2009.01) |

(52) U.S. Cl.
CPC ..... *H04B 7/18513* (2013.01); *H04B 7/18519* (2013.01); *H04W 84/06* (2013.01); *H04W 88/16* (2013.01)

(58) Field of Classification Search
CPC ........... H04B 7/18513; H04B 7/18519; H04W 84/06; H04W 88/16
See application file for complete search history.

(56) References Cited

U.S. PATENT DOCUMENTS

| | | | | |
|---|---|---|---|---|
| 7,792,487 | B2 * | 9/2010 | Monte ................. | H04B 7/1853 |
| | | | | 455/12.1 |
| 9,681,337 | B2 * | 6/2017 | Davis ................ | H04W 36/0005 |
| 9,888,426 | B2 * | 2/2018 | Ulupinar ............ | H04B 7/18541 |
| 11,277,199 | B1 * | 3/2022 | Regunathan ....... | H04B 7/18517 |
| 11,589,315 | B2 * | 2/2023 | Roy ..................... | H04W 52/146 |
| 2013/0109299 | A1 * | 5/2013 | Roos .................. | H04B 7/18513 |
| | | | | 455/12.1 |
| 2013/0331026 | A1 * | 12/2013 | O'Neill ................ | H04W 88/16 |
| | | | | 455/12.1 |
| 2016/0277096 | A1 * | 9/2016 | Wu .................... | H03M 13/2906 |

(Continued)

*Primary Examiner* — Bailor C Hsu
(74) *Attorney, Agent, or Firm* — Botos Churchill IP Law LLC

(57) ABSTRACT

The technology provides a gateway system that enables satellite communication with user equipment (UE). A system includes multiple gateways, where each gateway includes processing devices, baseband units, a gateway channel routing block, and a set of antennas for communicating with a constellation of orbiting satellites. The gateways include a primary gateway and a diversity gateway. A set of communication links operatively connects the gateways together. A diversity combiner may be operatively coupled to the gateways via one or more of the communication links. The diversity combiner is configured to receive and combine signals from at least two of the gateways. The system is configured to determine when to switch a satellite communication link from the primary gateway to the diversity gateway according to a threshold level of communication requirement based on a status condition of the primary gateway and a status condition of the diversity gateway.

21 Claims, 3 Drawing Sheets

(56)          References Cited

U.S. PATENT DOCUMENTS

2021/0044515 A1*   2/2021   Regunathan ......... H04B 7/1851
2021/0058293 A1*   2/2021   Whitefield ......... H04B 7/18539
2022/0321177 A1*   10/2022   Beidas ................ H04B 7/0413

* cited by examiner

SATELLITE COMMUNICATION SYSTEM WITH GATEWAY DIVERSITY

CROSS-REFERENCE TO RELATED APPLICATIONS

This application claims the benefit of and priority to U.S. Provisional Patent Application No. 63/339,001, having a filing date of Jul. 13, 2022, the entire disclosure of which is incorporated by reference herein.

BACKGROUND OF THE RELATED ART

A low-Earth orbit (LEO) satellite constellation provides global coverage including coverage to ordinary mobile phones (UEs in 4G) that are outside the coverage area of terrestrial cell towers (including oceans). U.S. Pat. No. 9,973,266 and U.S. Patent Publication No. 2019/0238216 show a system for assembling a large number of small satellite antenna assemblies in space to form a large array, the entire content which are incorporated herein by reference, the entire disclosures of which are incorporated herein by reference.

SUMMARY OF THE INVENTION

Figure 1:
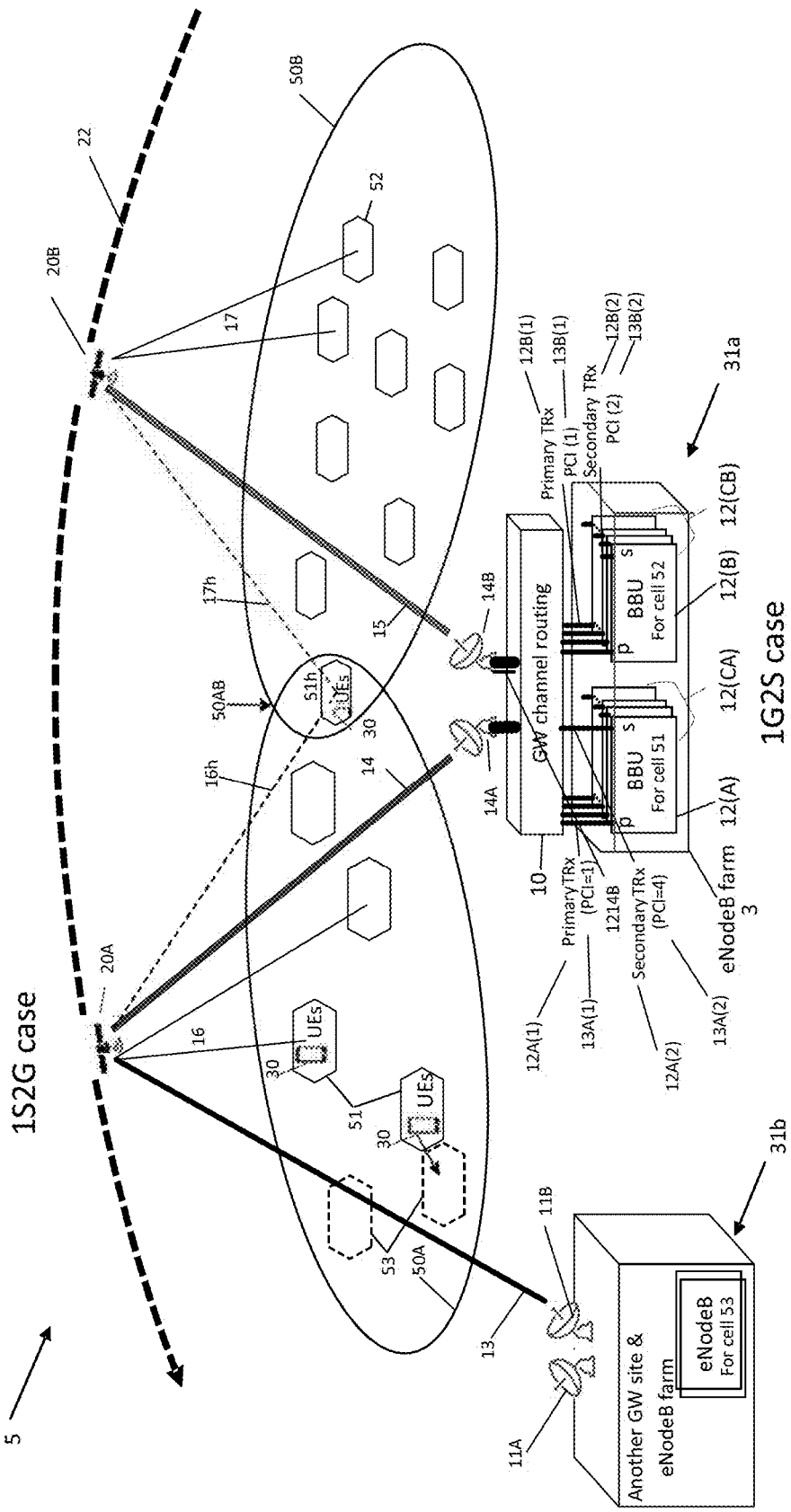
FIG. 1 illustrates a satellite and ground station communication system in accordance with aspects of the technology.

Aspects of the technology provide a gateway system that enables satellite communication with user equipment (UE). According to one aspect, the system includes a plurality of gateways, a plurality of communication links, and a diversity combiner. Each gateway includes one or more processing devices, a set of baseband units, a gateway channel routing block, and a set of antennas configured to communicate with a constellation of orbiting satellites. The plurality of gateways includes a primary gateway and a diversity gateway. The plurality of communication links operatively connects each of the plurality of gateways. The diversity combiner is operatively coupled to the plurality of gateways via one or more of the plurality of communication links. The diversity combiner is configured to receive and combine signals from at least two of the plurality of gateways. The system is configured to determine when to switch a satellite communication link from the primary gateway to the diversity gateway according to a threshold level of communication requirement based on a status condition of the primary gateway and a status condition of the diversity gateway.

In one example, the plurality of communication links provides a mesh configuration for communication between the plurality of gateways. In another example, the plurality of communication links provides a star configuration for communication between the plurality of gateways. Alternatively or additionally to any of the above, the diversity combiner is arranged at a geographically central location relative to the plurality of gateways. Moreover, each gateway may be geographically remote from the other gateways in the plurality, separated by a minimum physical distance.

In one scenario, the system further comprises a network control center separate from the plurality of gateways, in which the network control center includes the diversity combiner and is configured to provide updated communication information to the diversity gateway. Here, the network control center may be further configured to decide which gateway of the plurality of gateways is the primary gateway.

In one scenario, when the primary gateway is communicating with a setting satellite of the constellation of orbiting satellites, then no switch is made of the satellite communication link from the primary gateway to the diversity gateway. In another scenario, when the status condition of the primary gateway and the status condition of the diversity gateway both do not satisfy a status condition threshold, then no switch is made from the primary gateway to the diversity gateway.

Alternatively or additionally to any of the above, the system may be configured to determine when to switch the satellite communication link according to different weather conditions at the primary gateway and at the diversity gateway. Moreover, each gateway of the plurality of gateways may be configured as a backup to one or more other ones of the plurality of gateways.

According to another aspect of the technology, a system is provided that is configured for satellite communication with user equipment (UE). The system comprises a plurality of gateways and a network control center. Each gateway includes one or more processing devices, a set of baseband units, a gateway channel routing block, and a set of antennas configured to communicate with a constellation of orbiting satellites. The plurality of gateways includes a primary gateway and a diversity gateway. The network control center is operatively coupled to the plurality of gateways. The network control center is configured to receive and combine signals from at least two of the plurality of gateways and to provide updated communication information to the diversity gateway. The system is configured to determine when to switch a satellite communication link from the primary gateway to the diversity gateway according to a threshold level of communication requirement based on a status condition of the primary gateway and a status condition of the diversity gateway.

The network control center may be further configured to decide which gateway of the plurality of gateways is the primary gateway. According to one scenario, when the primary gateway is communicating with a setting satellite of the constellation of orbiting satellites, then no switch is made of the satellite communication link from the primary gateway to the diversity gateway. The system may be configured to determine when to switch the satellite communication link according to different weather conditions at the primary gateway and at the diversity gateway. Moreover, each gateway of the plurality of gateways may be configured as a backup to one or more other ones of the plurality of gateways.

According to a further aspect of the technology, a method for implementing satellite communication with user equipment (UE) is provided. The method comprises: providing a plurality of gateways, each gateway including one or more processing devices, a set of baseband units, a gateway channel routing block, and a set of antennas configured to communicate with a constellation of orbiting satellites, wherein the plurality of gateways includes a primary gateway and a diversity gateway; operatively connecting each of the plurality of gateways using a plurality of communication links; and determining when to switch a satellite communication link from the primary gateway to the diversity gateway according to a threshold level of communication requirement based on a status condition of the primary gateway and a status condition of the diversity gateway.

The method may further comprise deciding, by a network control center operatively coupled to the plurality of gateways, which gateway of the plurality of gateways is the primary gateway. In one scenario, when the primary gateway is communicating with a setting satellite of the constellation of orbiting satellites, then no switching of the satellite communication link is made from the primary gateway to the diversity gateway. Moreover, determining when to switch the satellite communication link may be performed according to weather conditions at the primary gateway and at the diversity gateway.

DETAILED DESCRIPTION OF THE INVENTION

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Referring to the drawings, FIG. 1 shows a satellite communication system 5 having a satellite 20 and a gateway site or ground station 31 in accordance with one embodiment of the present disclosure. The gateway site 31 includes a gateway channel routing block 10 that provides the appropriate channels signal for corresponding to two gateway antennas 14A and 14B, which are directional antennas tracking the satellites, and a plurality of eNodeBs, like 12(A) and 12(B) for every geographical cell. The gateway site 31 is in communication with User Equipment (UEs) via a setting satellite 20A and a rising satellite 20B. The satellite devices 100, here labeled as satellites 20A, 20B, communicate with the UEs over respective setting TRx beams 16 and rising TRx beams 17. FIG. 1 illustrates both the 1G2S (1 serving gateway site (GWS) that links with 2 neighbor Satellites simultaneously) case, highlighting one of the cells in 2 satellites footprint overlapping area going through beam handover; and 1S2G (1 Satellite that has RF links with 2 GWS simultaneously) case for gateway handover.

UEs can be in an idle state and those UEs would only monitor the cells and carry out cell reselection and tracking area update when needed (e.g., for paging), there is no need for the eNodeBs to take care of them in beam handover (BHO). The BHO takes care of the active UEs only. The active UEs are or include the UEs in a call, and need an eNodeB dedicated control to move from setting satellite beam to the rising satellite beam. The gateway channel routing block 10 manages the required channels for satellites 20A, 20B, so that they provide the scheduled services to the cells 53 intended dynamically. All the channels/cells signal served by a satellite are packed together and passed between GW and satellite via feeder link (different from the MNO's LTE spectrum) beams 14 and 15, while each cell 53 being served by the satellite uses MNO's spectrum via electronic steerable beams. Another gateway site 31b includes gateway antennas 11A, 11B, with respect to their serving eNodeBs (such as Base Band Units (BBUs) for cells 53) and feeder link beam 13. The feeder link beams 13, 14 and 15 may, for example, have a wide bandwidth with frequency of 40-50

GHz. And the service link beams are controlled by a Network Mobile Operator (NMO).

FIG. 1 further shows the satellites 20A, 20B's RAN (radio access network, e.g., GSM, LTE and 5G NR) signal footprints or field of Views (FoV) 50A, 50B on the Earth surface. The setting satellite 20A has a setting satellite FoV 50A, and the rising satellite 20B has a rising satellite FoV The setting and rising FoVs 50A and 50B, in which the satellites communicate with UEs directly in their cells with serving beams on downlink (DL) and uplink (UL). The setting and rising FoVs 50A and 50B overlap (or at least partially overlap) in the overlapping area 50AB. In accordance with one embodiment, BHO occurs for the cells 51h located inside the overlapping FoV area 50AB.

The ground cells 53 are served by the two satellites 20A, 20B, which are linked to the gateway channel routing block 10, via gateway antennas 14A, 14B that interface with the respective processing devices (e.g., eNodeBs) 12 serving those ground cells. The processing devices 12 control communication with the UEs via the satellites 20, 20A, 20B. In particular, FIG. 1 illustrates one embodiment of a system, including a 1G2S (1 Gateway that links with 2 Satellite) mobile communication system 5, though other configurations can also be handled. As shown, the satellite communication system 5 includes a base or ground station 31, which contains a farm (such as an eNodeB farm) 3 and GW channel routing block 10 that communicate over two satellites 20B, and multiple UEs 30 in a beam HO cell 51h in the satellite overlapping area 50AB (here, overlapping ground cells are labelled 51h and non-overlapping cells are labelled 51, 52. The cells 51 will change to cells 52 as the satellites orbit around the earth on path 22). In certain examples, a gateway may include gateway antennas 14A, 14B and the gateway channel routing block 10.

In the example embodiment of FIG. 1, two ground stations 31a, 31b are shown. The first ground station 31a communicates with the UEs in the first and second FOVs 50A, 50B via the first and second satellites 20A, 20B, respectively. The second ground station 31b communicates with the UEs in the first FOV 50A via the first satellite 20A, and may communicate with the UEs in one or more neighboring FOVs via one or more neighboring satellite(s).

In some examples, the ground stations 31 have many base station BBUs, e.g., an eNB farm and minimum of two directional antennas 14A, 14B via a gateway-satellite feeder link 14, 15 respectively carrying the BTS/LTE/5G downlink (DL) and uplink (UL) signals for their footprints 50B. The drawing highlights one of the HO cells 51h in the overlapping area 50AB, to illustrate where BHO happens. One or more UEs are in the BHO cells 51h. The processing device 12 can be, for example, a server or computer such as RAN base station forms, such as BTS for GSM, eNodeB for LTE and gNodeB for 5G, which transmit (Tx) and receive (Rx) LTE signals and can communicate with a GWS device that is located at the ground station. The satellites 20A are in communication with the ground station antennas 14A, 14B. The first satellite 20A is setting, i.e., leaving the current footprint 50A for the ground station antenna 14A, and the second satellite 20B is rising or ascending, serving the footprint 50B for the ground station antenna 14B.

The ground station processing device 12 (e.g., the eNodeB), can be configured to control operation of the satellite communication system 5, including communication between the satellite and the UEs and communication between the satellite 20 and the ground stations 31. In particular, the eNodeB 12 can dynamically configure the RAN for the satellite 20 to provide on-demand resource allocation, for example, bandwidth and/or power allocation. As the satellite 20 orbits the Earth, beam handover is conducted periodically, for example every 1-10 minutes, and typically about every 5 minutes. As noted, handover need not be provided for inactive user equipment.

Figure 2A:
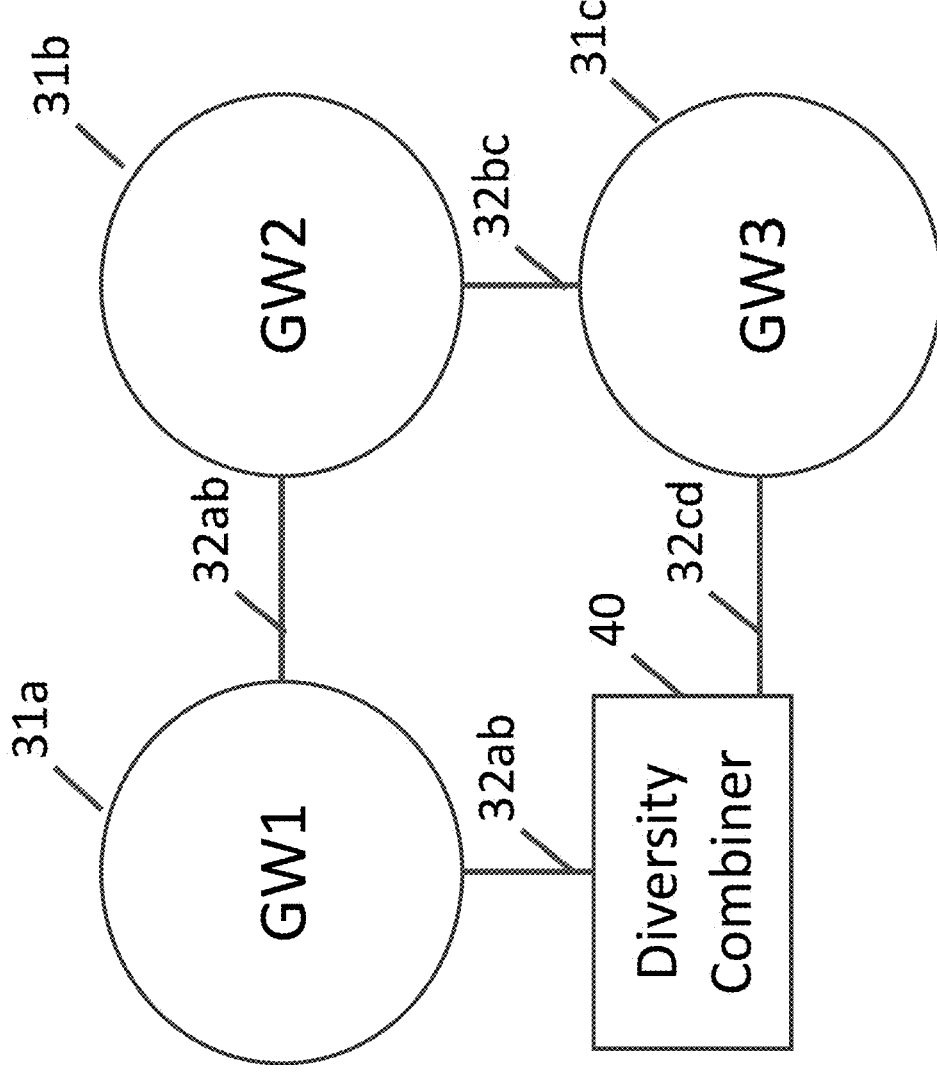
FIGS. 2(a)-(b) illustrate examples of gateway diversity in accordance with aspects of the technology
Figure 2B:
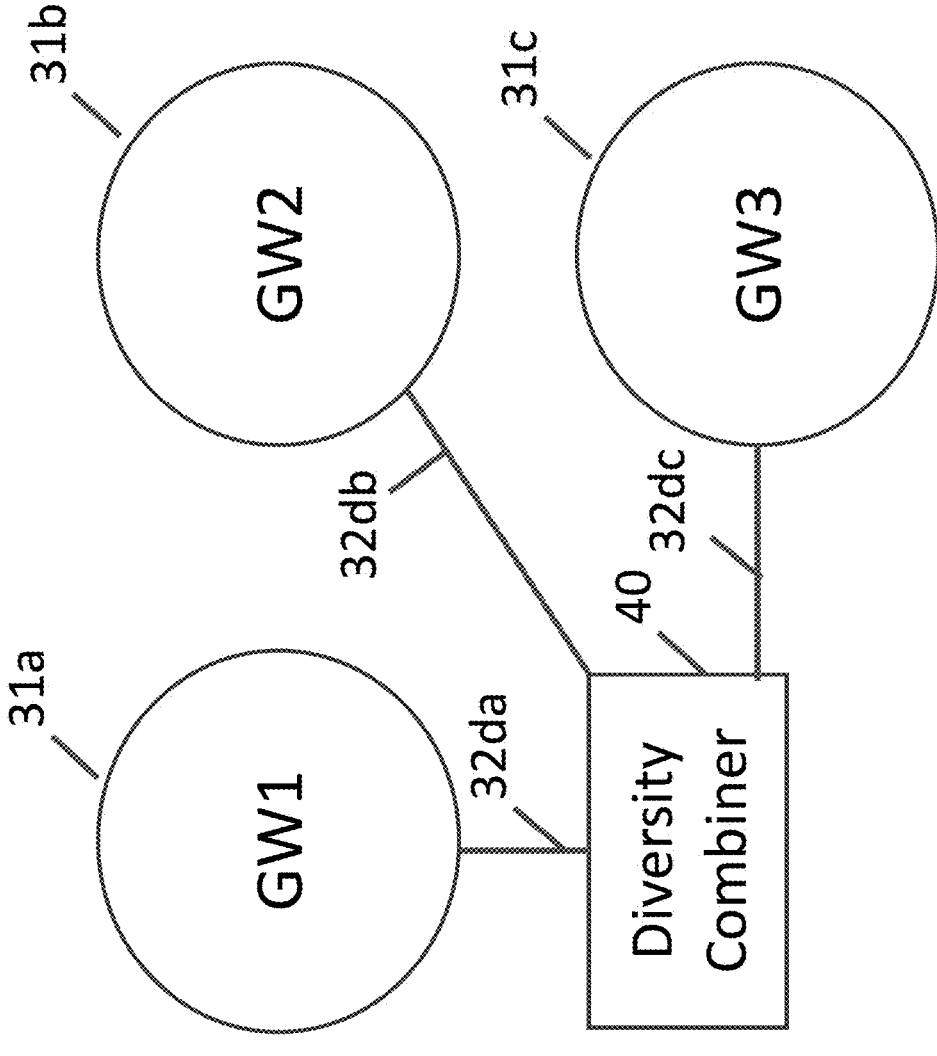

Referring to FIG. 2(*a*), an example embodiment of the disclosure is shown. Here, the gateways 31 of the satellite communication system 5 are shown. There can be multiple gateways 31 provided, and in the present example there is a first gateway GW1 31*a*, a second gateway GW2 31*b*, and a third gateway GW3 31*c*. The gateways 31*a*, 31*b*, 31*c* can all include the same components and functions as discussed above, including one or more eNodeBs 12, BBUs, routing and antennas 11, 14. Here, it is shown that the gateways 31 can communicate with one another in a mesh configuration (FIG. 2(*a*)) or a star configuration (FIG. 2(*b*)), though any suitable configuration can be provided. In addition, a diversity combiner 40 can be provided to process and combine signals. Any suitable diversity combiner can be provided, such as for example as shown and described in U.S. Patent Pub. No. 2020/0412440, the entire contents of which are hereby incorporated by reference.

This combiner might just be a central location where the baseband equipment is provided, so such equipment does not need to be duplicated, although this has other challenges, especially due to latency. In general, the NCC will play a big role by understanding the conditions of GW1 and GW3 and understanding which one can be primary considering the environmental conditions and the status of the particular GW.

The gateways 31 are in communication with one another in accordance with FIGS. 2(*a*) and 2(*b*) via a communication link 32, such as via electrical wire or optical wire. As illustrated, in the mesh embodiment (FIG. 2(*a*)), a communication link 32*ab* can be provided between the first gateway 31*a* and the second gateway 31*b*. And a link 31*ad*, 31*cd* can be provided between the diversity combiner 40 and the first and second gateways 31*a*, 31*c*, respectively. In the star embodiment (FIG. 2(*b*)), the first, second and third gateways 31*a*, 31*b*, 31*c* communicate with the diversity combiner via a respective link 32*da*, 32*db*, 32*dc*.

The gateways 31 can be located remote from one another. In certain embodiments, the gateways 31 can be at a distance of 25 km or more. Thus, the weather and conditions at one gateway 31 might differ from the weather and conditions at another gateway 31. The gateways 31 operate as backups to each other. Thus, for example, if the first gateway 31*a* malfunctions or otherwise has communication difficulties, such as due to rain or other weather conditions, the second gateway 31*b* and/or third gateway 31*c* can handle communications. That is, if the first gateway 31*a* is unable to communicate with the first satellite 20A, the second gateway 31*b* can take over for the first gateway 31*a* and communicate with the first satellite 20A. Switching from GW1 to GW2 provides improved QoE (Quality of Experience). The decision on when to switch can be based on a threshold level of communication, such as QoE or other measure.

Determining QoE is a multilayer decision. The NCC on ground should evaluate the conditions of the primary and the diversity gateway. If primary is in good condition, it will always be the default GW. If primary is not and diversity GW is in good conditions, then the target is to use that one. If both are in bad conditions, the system will keep the primary. But the system also needs to consult with the SOC (satellite operations software) and make sure there is sufficient time prior to a satellite pass to request the GW change. If this is not done, then the system performance may be impacted. In a HO situation, things are simpler as the system is switching satellites, but if the GW is operating with the setting satellite, there is no GW change.

The NCC is the clock of the system. It talks to both gateways all the time. And it will be the one that has the information to decide which one is primary. But also the NCC talks to the SOC that is the entity managing the satellites. When the NCC wants to switch to the diversity GW it needs to consult with the SOC. If SOC is OK, then the information will also flow to the satellite so the antenna will point to the right GW. The Network Control Center (NCC) connects the diversity gateway and makes sure it is ready with all the updated information.

The ground stations 31 can include a processing device (such as an eNodeB) to perform various functions and operations in accordance with the present disclosure. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the present disclosure can be stored on or read from the storage device. The processing device can execute software that can be stored on the storage device. Unless indicated otherwise, the process is preferably implemented in automatically by the processor substantially in real time without delay.

One advantage of the present system 5 is that the user equipment need not be modified. Accordingly, the system 5 can be utilized with standard user equipment, as all the operation is controlled by the eNodeB 12.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings. Numerous applications will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A system configured for satellite communication, the system comprising:

a plurality of gateways, each gateway including one or more processing devices, a set of baseband units, a gateway channel routing block, and a set of antennas configured to communicate with a constellation of orbiting satellites, wherein the plurality of gateways includes a primary gateway and a diversity gateway;

a plurality of communication links operatively connecting each of the plurality of gateways; and a diversity combiner operatively coupled to the plurality of gateways via one or more of the plurality of communication links, the diversity combiner being configured to receive and combine signals from at least two of the plurality of gateways;

wherein the system is configured to determine when to switch a satellite communication link from the primary gateway to the diversity gateway according to a threshold level of communication requirement based on a status condition of the primary gateway and a status condition of the diversity gateway.

2. The system of claim 1, wherein the plurality of communication links provides a mesh configuration for communication between the plurality of gateways.

3. The system of claim 1, wherein the plurality of communication links provides a star configuration for communication between the plurality of gateways.

4. The system of claim 1, wherein the diversity combiner is arranged at a geographically central location relative to the plurality of gateways.

5. The system of claim 1, wherein each gateway is geographically remote from the other gateways in the plurality, separated by a minimum physical distance.

6. The system of claim 1, further comprising a network control center separate from the plurality of gateways, the network control center including the diversity combiner and being configured to provide updated communication information to the diversity gateway.

7. The system of claim 6, wherein the network control center is further configured to decide which gateway of the plurality of gateways is the primary gateway.

8. The system of claim 1, wherein when the primary gateway is communicating with a setting satellite of the constellation of orbiting satellites, then no switch is made of the satellite communication link from the primary gateway to the diversity gateway.

9. The system of claim 1, wherein the system is configured to determine when to switch the satellite communication link according to different weather conditions at the primary gateway and at the diversity gateway.

10. The system of claim 1, wherein each gateway of the plurality of gateways is configured as a backup to one or more other ones of the plurality of gateways.

11. The system of claim 1, wherein when the status condition of the primary gateway and the status condition of the diversity gateway both do not satisfy a status condition threshold, then no switch is made from the primary gateway to the diversity gateway.

12. The system of claim 1, wherein the constellation of orbiting satellites is configured for direct communication with user equipment (UE).

13. A system configured for satellite communication, the system comprising:

a plurality of gateways, each gateway including one or more processing devices, a set of baseband units, a gateway channel routing block, and a set of antennas configured to communicate with a constellation of orbiting satellites, wherein the plurality of gateways includes a primary gateway and a diversity gateway; and a network control center operatively coupled to the plurality of gateways, the network control center being configured to receive and combine signals from at least two of the plurality of gateways and to provide updated communication information to the diversity gateway;

wherein the system is configured to determine when to switch a satellite communication link from the primary gateway to the diversity gateway according to a threshold level of communication requirement based on a status condition of the primary gateway and a status condition of the diversity gateway.

14. The system of claim 13, wherein the network control center is further configured to decide which gateway of the plurality of gateways is the primary gateway.

15. The system of claim 13, wherein when the primary gateway is communicating with a setting satellite of the constellation of orbiting satellites, then no switch is made of the satellite communication link from the primary gateway to the diversity gateway.

16. The system of claim 13, wherein the system is configured to determine when to switch the satellite communication link according to different weather conditions at the primary gateway and at the diversity gateway.

17. The system of claim 13, wherein each gateway of the plurality of gateways is configured as a backup to one or more other ones of the plurality of gateways.

18. A method for implementing satellite communication, the method comprising:

providing a plurality of gateways, each gateway including one or more processing devices, a set of baseband units, a gateway channel routing block, and a set of antennas configured to communicate with a constellation of orbiting satellites, wherein the plurality of gateways includes a primary gateway and a diversity gateway;

operatively connecting each of the plurality of gateways using a plurality of communication links; and determining when to switch a satellite communication link from the primary gateway to the diversity gateway according to a threshold level of communication requirement based on a status condition of the primary gateway and a status condition of the diversity gateway.

19. The method of claim 18, further comprising deciding, by a network control center operatively coupled to the plurality of gateways, which gateway of the plurality of gateways is the primary gateway.

20. The method of claim 18, wherein when the primary gateway is communicating with a setting satellite of the constellation of orbiting satellites, then no switching of the satellite communication link is made from the primary gateway to the diversity gateway.

21. The method of claim 18, wherein determining when to switch the satellite communication link is performed according to weather conditions at the primary gateway and at the diversity gateway.

* * * * *